United States Patent [19]
Vanderauwera et al.

[11] Patent Number: 5,545,241
[45] Date of Patent: Aug. 13, 1996

[54] AIR CLEANER

[75] Inventors: Raymond Vanderauwera, St-Pieters-Leeuw; Paul Coulonvaux, Brussels, Belgium

[73] Assignee: Donaldson Company, Inc., Minneapolis, Minn.

[21] Appl. No.: 373,000

[22] Filed: Jan. 17, 1995

[51] Int. Cl.$^6$ ..................................................... B01D 35/30
[52] U.S. Cl. ........................... 55/490; 55/493; 55/504; 55/503
[58] Field of Search .......................... 55/490, 493, 503, 55/504, 505; 285/80

[56] References Cited

U.S. PATENT DOCUMENTS

| | | |
|---|---|---|
| 3,078,650 | 2/1963 | Anderson et al. . |
| 4,491,460 | 1/1985 | Tokar . |
| 4,720,292 | 1/1988 | Engel et al. . |
| 5,013,182 | 5/1991 | Coulvonvaux et al. . |

*Primary Examiner*—Romulo H. Delmendo
*Attorney, Agent, or Firm*—Merchant, Gould, Smith, Edell, Welter & Schmidt

[57] ABSTRACT

An air cleaner (10) includes a housing (12) having a first section (14) and a second section (16). The first and second sections (14) and (16) are rotationally adjustable relative to one another. Alignment teeth (42) and (60) engage one another to position the two sections (14) and (16) relative to one another. Buckle type clasps (60) engage a ridge (44) to cam together the sections (14) and (16) and lock them in sealed engagement. A mounting bracket (80) includes a somewhat flexible band (82) which extends around the housing (12). The band (82) includes raised block portions (88) extending radially inward and spaced about the inner surface of the band (82). The housing includes a locking portion (30) having recesses formed therein which are spaced and aligned to receive raised block portions (88) of the mounting band (82). When the bracket (80) is placed around the housing (12), the raised block portions engage the recesses of the lock portion (30) and the bracket (80) is held in place. If rotational adjustment is needed between the bracket (80) and the housing (12), the band portion (82) is flexed outward so that the raised block portions may disengage. The band (82) is then unflexed to retain the bracket (80) in its new position.

20 Claims, 5 Drawing Sheets

AIR CLEANER

BACKGROUND OF THE INVENTION

1. Field of the Invention

The present invention relates to an air cleaner and in particular to an air cleaner which has a housing that can be aligned in several configurations and a mounting bracket which may be rotated relative to the housing.

2. Description of the Prior Art

Air cleaners are used for a wide variety of applications. Air cleaners typically use a filter element inside of a housing having an inlet and outlet so that the air passes through an exterior of a cylindrical filter element and out through the interior after passing through filter material, thereby trapping particulate material. In addition, air cleaners which utilize cyclonic air flow to enhance filtering have also been developed. An example of such an air cleaner with a deflecting intake tube is shown in U.S. Pat. No. 4,491,460 issued to Donaldson Company, the assignee of the present invention. The air cleaner produces a helical air flow resulting in the centrifugal separation of the heaviest particular matter. The air cleaner also includes a scavenge outlet which receives the heaviest particular matter which falls under gravity to reach the outlet. This provides for improved separation in filtering and extended filter life.

Mounting bands for mounting the air cleaner housing are well known. A prior mounting band is shown in U.S. Pat. No. 5,013,182, assigned to Donaldson Company. The mounting band fits around the housing and includes a spring to tighten the clamping action around the housing. Although this may retain the air cleaner in an appropriate position under most conditions, it may not prevent slipping of the housing under other conditions. In addition, the band may place undue tension around the housing under certain operating conditions. Other common bands used are metal clam shell type bands which have two pieces hinged together at one end and bolted together at a second end. This type of band may also place undue stress on the air cleaner and may corrode and rust, leading to failure.

It can be appreciated that in order for an air cleaner having helical air flow and a scavenge to efficiently operate, the scavenge should be placed at a lowermost portion of the air cleaner housing. This provides for gravity aiding in separation. To solve this problem, the mounting bracket needs to be adjustable to provide for orienting the scavenge in a downward direction. However, with inlets and outlets needed to be rearranged for different uses of the air cleaner, this is not always possible with the prior art devices.

It can be seen then, that an improved air cleaner is needed which provides a two part sealed housing for orienting the scavenge outlet at the lowermost portion of the housing. In addition, such an air cleaner should provide for positioning the inlet and outlet in numerous orientations while still maintaining the scavenge at a lowermost portion extending downward. In addition, a mounting bracket is needed which does not allow for slipping or rotation of the housing and which mounts to various surfaces while maintaining the proper inlet, outlet and scavenge outlet orientation. The mounting bracket should be easy to install and remove, preferably requiring no tools. The present invention addresses these as well as other problems associated with helical flow air cleaners.

SUMMARY OF THE INVENTION

The present invention is directed to an air cleaner and in particular to an air cleaner having a two part housing with the two housing sections being adjustable relative to one another. The present invention also includes a mounting bracket for the housing which is rotatably adjustable relative to the housing for mounting the air cleaner in various configurations.

The air cleaner housing is generally cylindrical and includes two sections. The first section includes the inlet extending tangentially to the cylindrical portion and an end outlet. Helical flow is imparted by a ramp engaging air received through the inlet tube. A filter element extends along the central axis of the housing and has air flow from an exterior to an interior of the filter and exiting the outlet tube.

The air cleaner includes a scavenge which receives the heaviest particulate material prior to the air flowing through the filter element. The scavenge includes a nipple portion which can be opened periodically to allow the particular material to be emptied from the air cleaner. To function optimally, the scavenge should be positioned at a lowermost portion of the housing for utilizing gravity as an aid to separation.

The mounting bracket for the housing has a somewhat flexible member having a band extending around the circumference of the housing. Concentric bands align the bracket with the housing. A lock portion having recesses formed therein is positioned on the outer surface of the housing between the concentric bands. The mounting bracket includes raised block portions extending radially inward which align with the recesses of the lock when attached. The band may be flexed outward to disengage and reposition the mounting bracket relative to the housing.

In addition to having the mounting bracket adjustable relative to the housing, the two housing sections are also rotationally adjustable relative to one another. According to a preferred embodiment, the first housing section includes an end portion having a serrated type ring having a plurality of teeth extending axially outward. The second section includes at lease two teeth which are positioned so that they align with and engage the teeth of the first section. Clasp type buckles engage a ridge proximate the serrated teeth of the first section to provide a camming action to lock the two sections together and to provide a sealed connection.

It can be appreciated that with the present invention, multiple mounting configurations are provided for. In addition, with each of the configurations, the scavenge may be aligned so that it is directed in a downward manner, thereby maintaining optimal performance.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, wherein like reference letters and numerals designate corresponding elements throughout the several views.

DETAILED DESCRIPTION OF THE PREFERRED EMBODIMENT(S)

Figure 1:
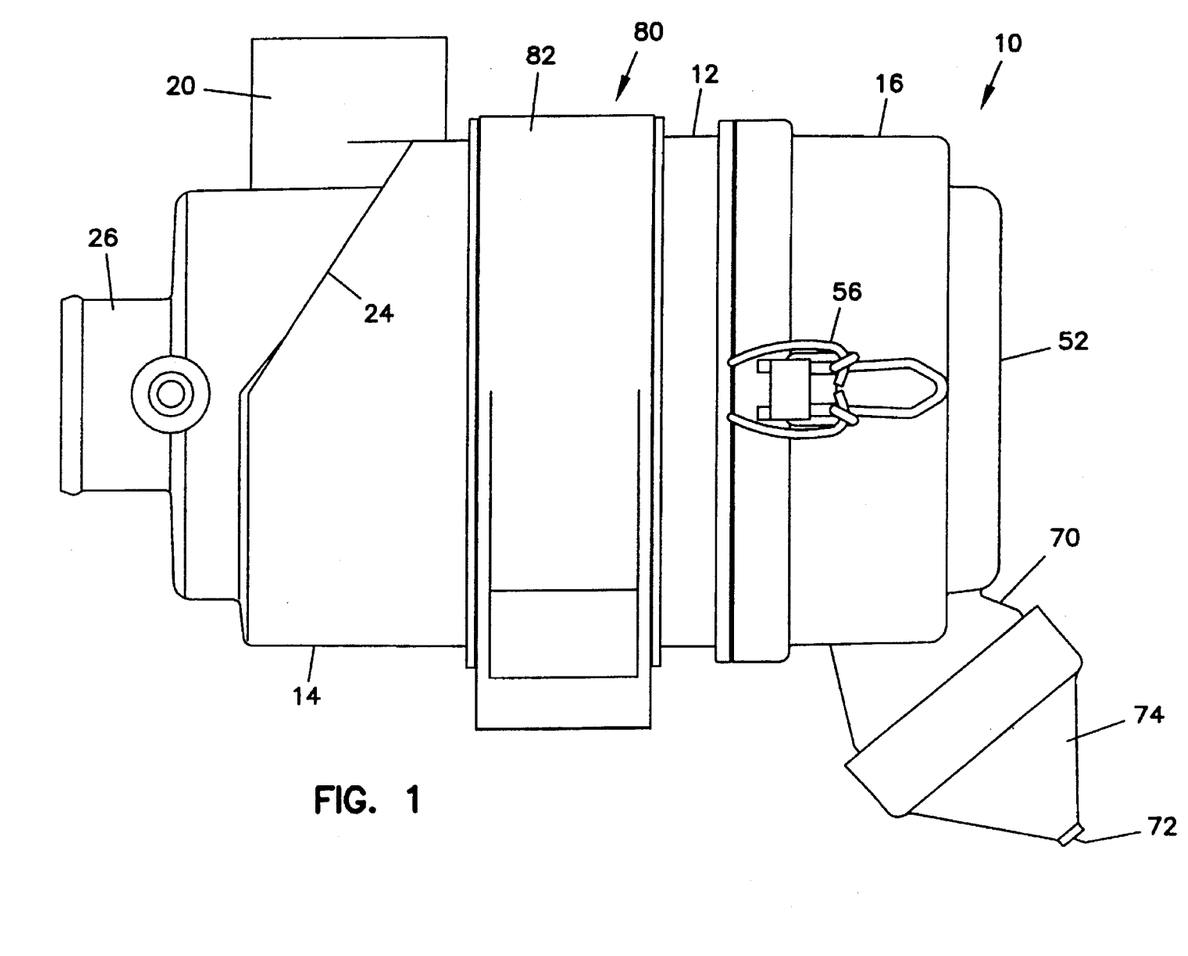
FIG. 1 shows a side elevational view of an air cleaner according to the principles of the present invention.

Referring now to the drawings, wherein like reference numerals designate corresponding structure throughout the views, and referring in particular to FIG. 1, there is shown an air cleaner, generally designated 10. The air cleaner 10 includes a housing 12 and housing filter element 100, shown more clearly in FIGS. 3 and 4. The housing 12 includes a first section 14 and a second section 16, and is preferably constructed of a durable plastic or other non-corroding material. The first housing section 14 includes a main cylindrical portion having an intake tube 20 formed therein as well as an outlet tube 26, shown in FIG. 2, and an inner cylindrical section (not shown) positions and holds the filter element (not shown). An angled ramping portion 24 directs air in a helical fashion to impart the helical flow. As shown in FIG. 3, at an open end of the first housing section 14, a number of concentric outer bands 28 extend about the periphery of the section 14. A lock portion 30 having recesses formed therein is formed between two or more of the bands 28. The first housing section 14 may also include a pressure sensor tap 32 for receiving an air pressure sensor.

At the open end of the first housing section 14 is formed a serrated ring 40, as shown in FIG. 3. A ridge 44 extends around the periphery of the serrated ring 40 for sealing against the second housing 16. In addition, the ridge 44 provides a locking surface for engaging retainer buckles, as explained hereinafter. The serrated ring 40 includes a plurality of teeth 42 extending thereabout in an annular fashion. The teeth 42 are spaced around the ring 40 and have peaks and valleys for receiving complimentary shaped teeth on the second housing section 16, as explained hereinafter.

Figure 4:
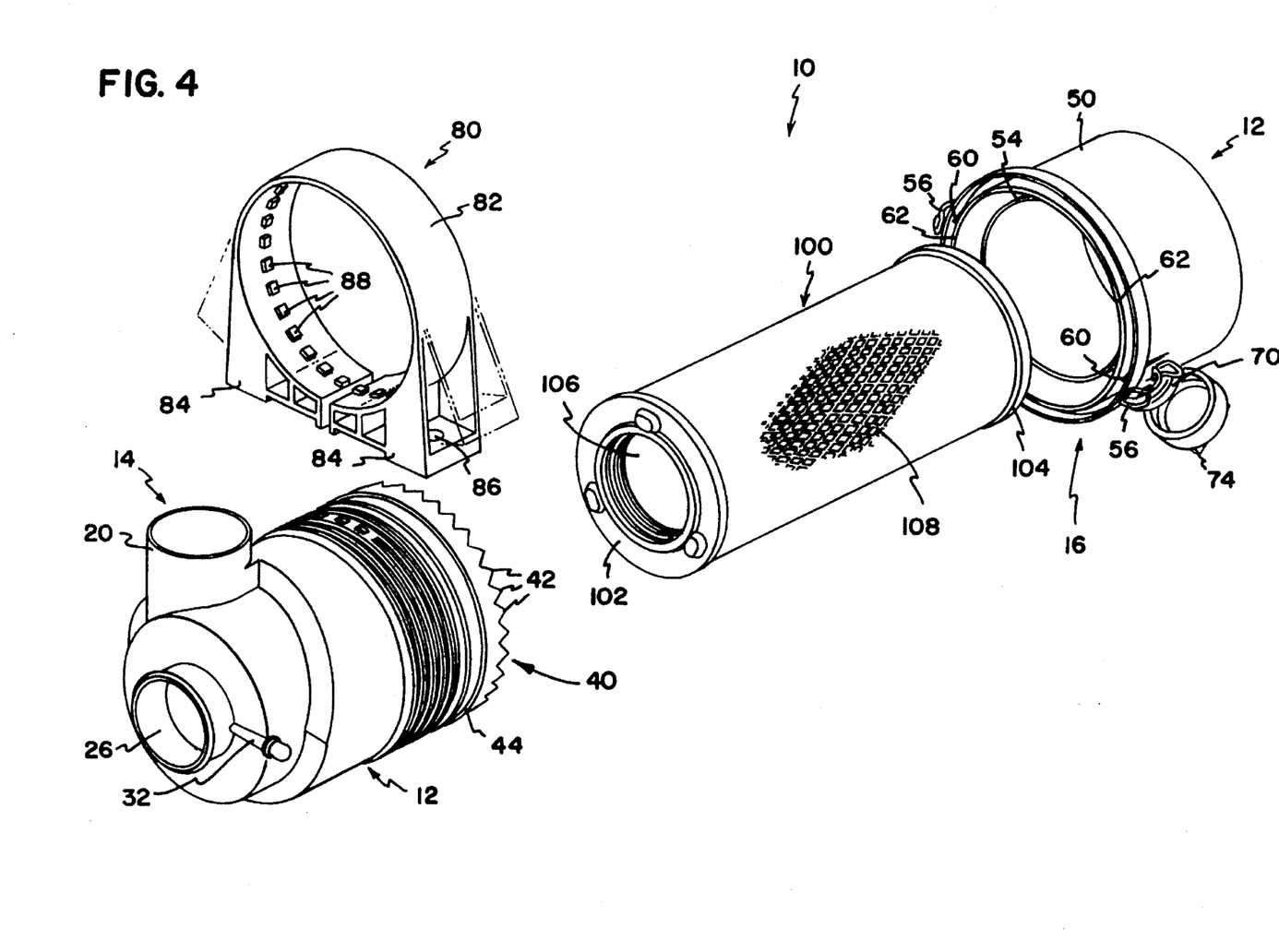
FIG. 4 shows an exploded perspective view of the air cleaner shown in FIG. 1; and, FIG. 5 shows a left end view of the air cleaner shown in FIG. 1 in an unmounted position.

The second housing section 16 includes a cylindrical portion 50 extending to a closed end section 52. As shown in FIG. 4, an inner cylinder 54 extends outward from the end portion 52 for fitting and aligning with the filter element 100. At the edge of the open end of the cylindrical portion 50, a pair of over center buckle type clasps 56 are mounted. The clasps 56 have a cam type locking arrangement engaging the ridge 44 on the first section. The clasps 56 are spaced proximate axially extending teeth 60 formed just inside the outer surface of the cylindrical portion 50. The teeth 60 engage the teeth 42 of the first section 14, as explained hereinafter. An alignment ring 62 is spaced just interior of the teeth 60 to form a seal with the ring 40 when the clasps 56 are engaged.

Figure 2:
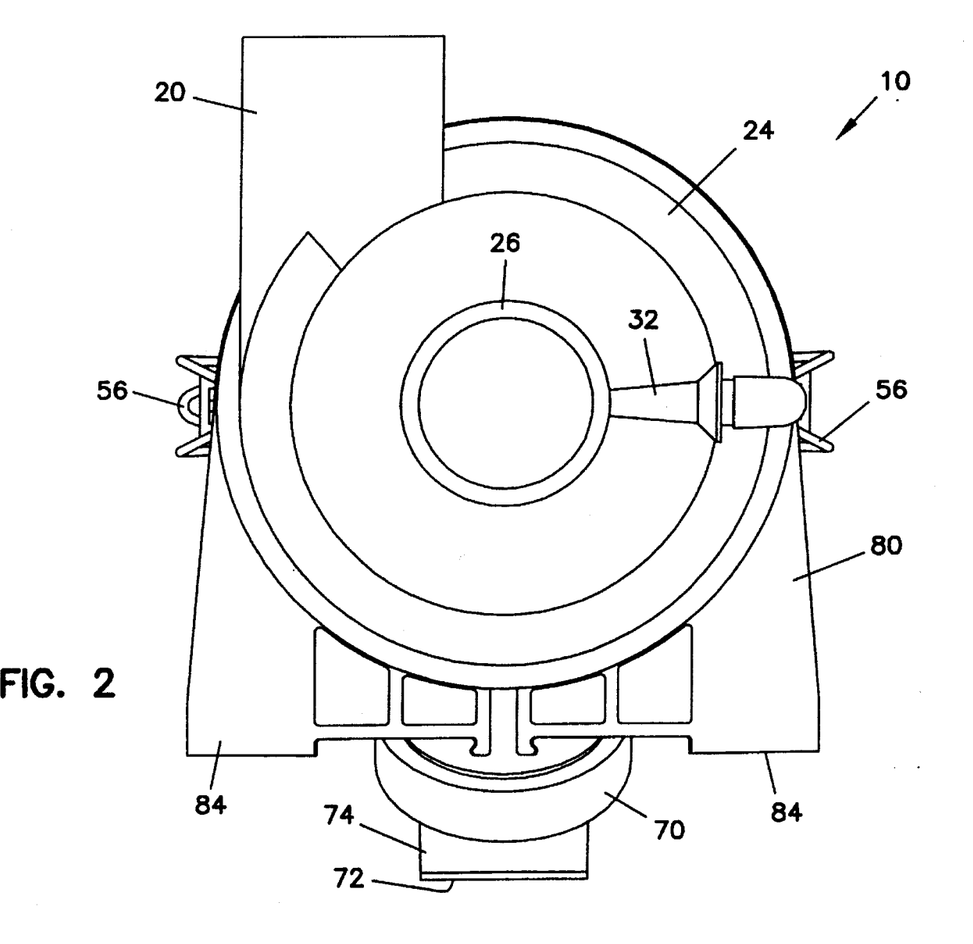
FIG. 2 shows a left end view of the air cleaner shown in FIG. 1 in a mounted position.
Figure 3:
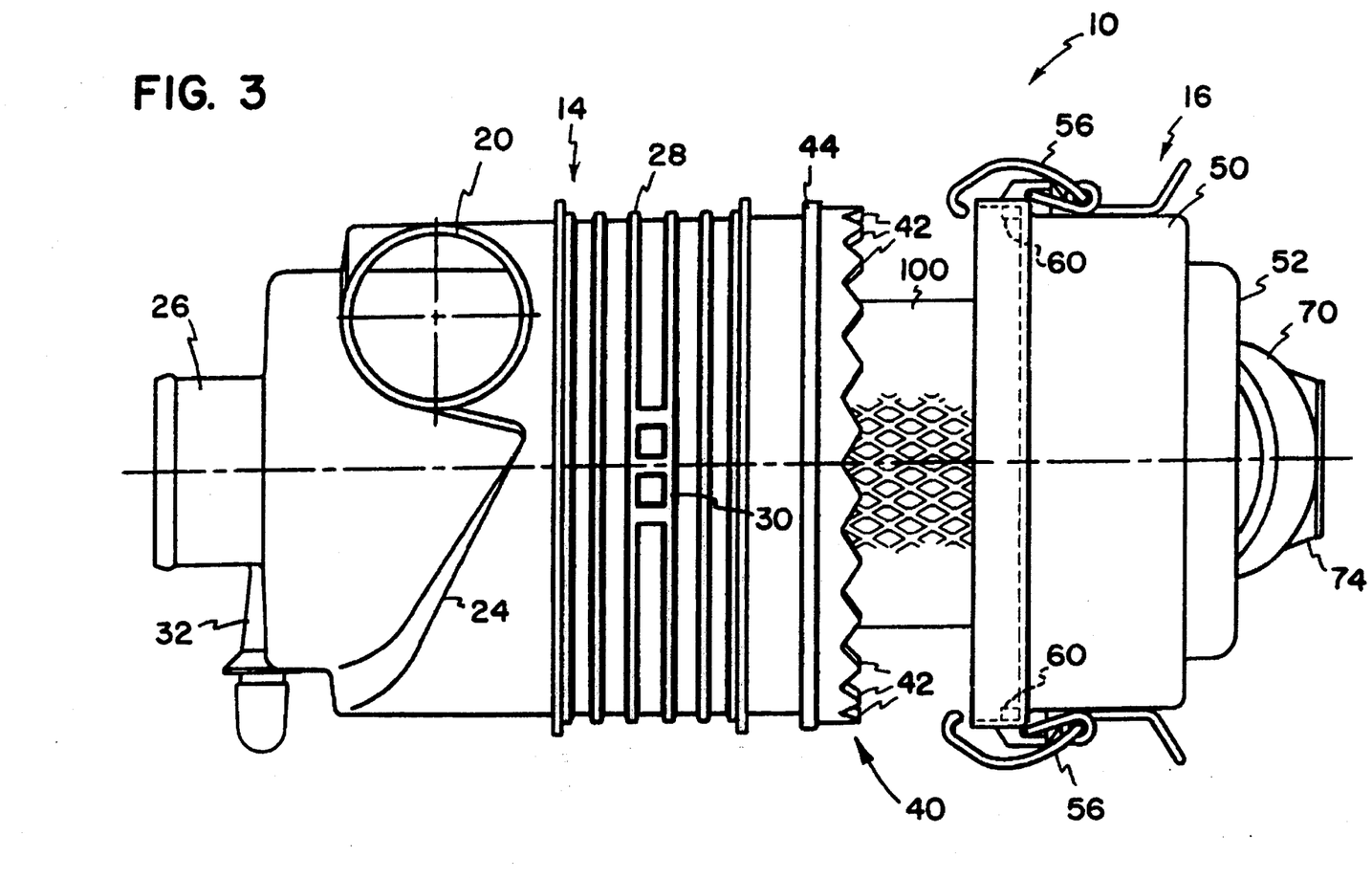
FIG. 3 shows a top partially exploded view of the air cleaner shown in FIG. 1.

As shown most clearly in FIGS. 1 and 2, at a lower end of the second housing section 16 is a scavenge 70 which collects and empties dust and other heavier particulate from the air cleaner 10. The scavenge 70 includes a nipple 74 having two flexible halves which form an opening 72. When the ends of the flat portion of the nipple 74 push together, the opening widens and the scavenge opens, thereby allowing collected material to empty.

In the preferred embodiment, as shown in FIG. 4, the filter element 100 includes an open end 102 and a closed end 104. The filter material 106 is generally pleated material which may take on several configurations depending on the use. A mesh portion 108 of steel or other suitable material may extend around the exterior of filtering material 106. It can be appreciated that other filter types and configurations may also be utilized with the present invention, without affecting the utility of the present invention.

Figure 5:
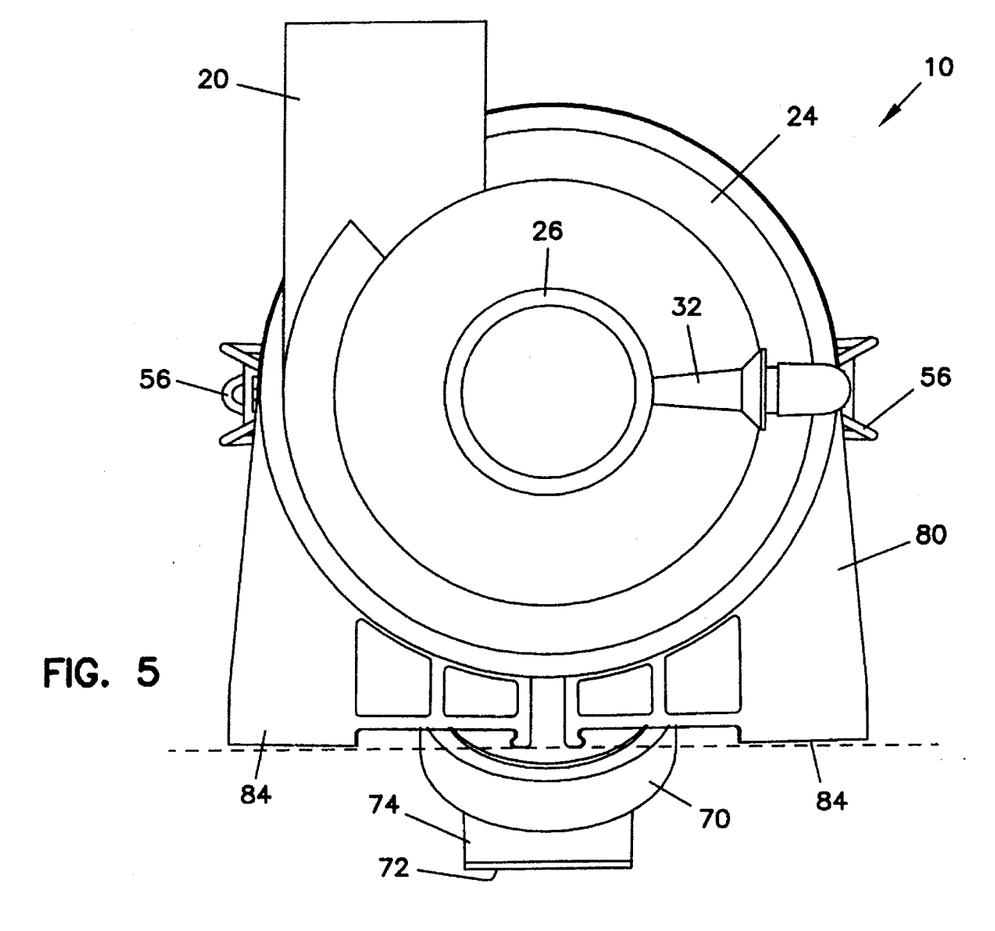

As shown in FIGS. 1, 2, 4 and 5, a mounting bracket 80 supports and attaches to the air cleaner housing 12. The bracket 80 includes a flexible band portion 82 configured to extend substantially around the cylindrical housing 12. The bracket 80 is a single piece which is preferably constructed of a molded plastic material which does not rust or corrode and which provides durability, yet allows sufficient flexure of the band portion 82 to mount and remove the bracket. The bracket 80 also includes surface mounting portions 84 having orifices 86 formed therein. The mounting portions 84 provide support for attaching screws, bolts or other mounting hardware for attaching bracket 80 to a suitable mounting surface as shown mounted in FIG. 2. As shown in FIG. 5, the mounting portions 84 include center members engaging the mounting surface while the outer edges of the mounting portions 84 are normally spaced away from the mounting surface so that a slight gap is formed. However, upon mounting the bracket 80, the mounting portions 84 are tightened against the mounting surface, pulling the outer edges of the mounting portions 84 against the mounting surface, pulling the outer edges of the mounting portions 84 against the mounting surface, thereby eliminating the gap, as shown in FIG. 2. This also tightens the band portion 82 against the housing 12 to prevent slipping. At an interior of the band portion 82, a plurality of raised block portions 88 extend radially inward. The raised block portions 88 are spaced about the interior of the band portion 82 at an equally spaced configuration for aligning with the recesses of the lock portion 30. It can be appreciated that the mounting bracket 80 can be placed on the housing 12 and properly positioned without the need for any tools.

In operation, air enters the intake tube 20 and is directed along the interior of the housing 12 until striking the angled ramp portion 24. This imparts a helical cyclonic air flow around the exterior of the filter element 100. Air is forced to flow through the filter material 106 to the interior of the filter 100. The filtered air then proceeds out the open end 102 of the filter element 100 and through the outlet 26. Heavier particulate material falls with the aid of gravity to the bottom of the housing 12 and collects at the scavenge 70 where it is evacuated automatically through the nipple 74 and the opening 72. It can be appreciated that the scavenge 70 must be at the lowermost portion of the housing 12 for gravity to aid in separating the heavier particulate material from the main air flow.

In order to facilitate this arrangement, it can be appreciated that the use of a single air cleaner in different applications may require different configurations for the intake tube 20 and outlet tube 26. In addition, the air cleaner 10 may be required to be mounted to either a side, bottom or overhead surface. This may require a number of different configurations to facilitate proper performance of the filter 100 and the scavenge 70. In addition, the housing 12 may be mounted so that the cylindrical portion extends vertically.

To accommodate different mounting configurations, the mounting bracket 80 must be adjustably attached to the housing 12. To attach the mounting bracket 80 to the housing 12, the first and second sections 14 and 16 are separated. The bracket band portion 82 is flexed outward, as shown in phantom in FIG. 4, so that it may slide over the raised concentric rings 28. When the mounting bracket is aligned so that the raised block portions 88 are between the bands 28 having the lock 30. The band 82 may then be released to an unflexed position to substantially follow the contour of the housing 12. The raised portions 88 will align with the recesses of the lock 30 to position the bracket 80 relative to the housing 12. If rotational adjustment is required the band 82 is flexed so that the housing 12 may be rotated relative to the bracket 80 for proper rotational alignment. The spaced block portions 88 provide an indexed mounting bracket 80 for incrementally varying the orientation of the housing 12. When the desired positioning has been achieved, a bracket 80 may be mounted to a suitable surface. When the bracket 80 is unflexed and mounted, it is self-clamping as the mounting portions 84 are held in place so that the band portion 82 cannot flex outward and the housing 12 is retained in a proper position.

When the first housing section 14 is properly aligned, the second section 16 must be connected to the first section 14 and properly aligned so that the scavenge 70 is directed downward. The second section 16 is placed adjacent the first section 14 so that the teeth 60 of the second section 16 align with and engage the teeth 42 of the first section. When proper alignment has been achieved, it can be appreciated that the alignment ring 60 and serrated ring 40 as well as the ridge 44 and cylindrical portion 50 form a sealed surface between the two sections 14 and 16. The over center clasps 56 are therein placed so that the hook portions engage the ridge 44. The actuating portions of the clasps 56 are then folded against the second section 16 and the camming action locks the two sections 14 and 16 together.

It can be appreciated that for alignment to change, the sections 14 and are rotated relative to one another so that the teeth 60 move relative to the teeth 42. Separation of the sections 14 and 16 is easily accomplished by lifting the actuating portions of the clasps 56 and allowing the hook portions to disengage the ridge 44. The buckle type clasps 56 may be aligned with any portion of the ridge 44 so that the second section 16 may be rotated relative to the first section 14 for different alignments which have the scavenge 70 directed downward no matter what the position of the inlet tube 20 or the mounting bracket 80. The present invention provides an air cleaner 10 having a number of configurations for adapting to different mounting and use conditions.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An air cleaner apparatus, comprising:
   a filter element;
   a generally cylindrical housing;
   an inlet;
   an outlet; and
   a rotatably adjustable mounting bracket adjustably attached about a periphery of the housing including means for indexed locking the mounting bracket against the housing.

2. An air cleaner apparatus, comprising:
   a filter element;
   a generally cylindrical housing;
   an inlet;
   an outlet; and
   a mounting bracket comprising a band including a plurality of raised blocks extending radially inward, and wherein the housing comprises a rotational locking portion having recesses formed therein for engaging the blocks of the mounting bracket.

3. An air cleaner according to claim 2, wherein the mounting bracket comprises a flexible band flexing from a nonflexed locked position to a flexed position wherein the raised portions disengage and the housing freely rotates relative to the mounting bracket.

4. An air cleaner according to claim 1, wherein the housing comprises a first housing member including the inlet and a second housing member including a scavenge.

5. An air cleaner according to claim 4, further comprising means for removably attaching the first housing member to the second housing member.

6. An air cleaner according to claim 5, wherein the housing member attachment means comprises an over center cam latch.

7. An air cleaner according to claim 5, further comprising an alignment means for aligning the first housing member to the second housing member.

8. An air cleaner according to claim 7, wherein the alignment means comprise a plurality of serrations mounted on one of said housing members and a complementary tooth mounted on the other of said housing members intermeshing with the serrations.

9. An air cleaner according to claim 8, wherein the other of said housing members comprises an inner annular ridge defining a channel against its interior, and wherein the complementary tooth is located in the channel, and wherein the serrations extend into the channel and engage the complementary tooth when assembled.

10. An air cleaner according to claim 1, wherein the mounting bracket comprises a one piece band and integral mounting portion.

11. An air cleaner according to claim 10, wherein the band is constructed of a molded plastic.

12. An air cleaner according to claim 1, wherein the mounting bracket comprises a pair of mounting portions, each mounting portion including a center member and an edge member, wherein, when the center members engage a mounting surface, in an unmounted position, at least one of the edge members retracts from the mounting surface.

13. An air cleaner apparatus, comprising:
    a filter element;
    a generally cylindrical housing retaining the filter element;
    means for imparting helical air flow around the filter element;
    an inlet;
    an outlet;
    a scavenge for collecting heavy particulate material; and,
    a rotatably adjustable mounting bracket having means for indexed locking the mounting bracket against the housing.

14. An air cleaner according to claim 13, wherein the housing further comprises a first housing member and a second housing member and means for removably attaching the first housing member to the second housing member.

15. An air cleaner according to claim 14, wherein the first housing member mounts to the second housing member in a rotatably adjustable configuration.

16. An air cleaner apparatus, comprising:
    a filter element;

a generally cylindrical housing retaining the filter element, and including a first housing member and a second housing member, wherein the first housing member mounts to the second housing member in a rotatably adjustable configuration;

alignment means comprising a plurality of serrations mounted on one of said housing members and a complementary tooth mounted on the other of said housing members intermeshing with the serrations;

means for imparting helical air flow around the filter element;

an inlet;

an outlet; and, a scavenge for collecting heavy particulate material.

17. An air cleaner according to claim 16, wherein the other of said housing members comprises an inner annular ridge defining a channel against its interior, and wherein the complementary tooth is located in the channel, and wherein the serrations extend into the channel and engage the complementary tooth when assembled.

18. An air cleaner housing apparatus, comprising:

a generally cylindrical housing comprising a first housing member and a second housing member and a plurality of serrations mounted on one of said housing members and a complementary tooth mounted on the other of said housing members intermeshing with the serrations;

an inlet;

an outlet; and a rotatably adjustable mounting bracket attached about a periphery of the housing.

19. A filter housing apparatus, comprising:

a generally cylindrical housing;

an inlet;

an outlet; and a rotatably adjustable mounting bracket attached about a periphery of the housing including means for indexed locking the mounting bracket against the housing.

20. A filter housing apparatus, comprising:

a generally cylindrical housing;

an inlet;

an outlet; and a mounting bracket comprising a band including a plurality of raised blocks extending radially inward, wherein the housing comprises a rotational locking portion having recesses formed therein for engaging the blocks of the mounting bracket.

* * * * *

US005545241B1

REEXAMINATION CERTIFICATE (3884th)

United States Patent [19]
Vanderauwera et al.

[11] B1 5,545,241
[45] Certificate Issued Sep. 28, 1999

[54] AIR CLEANER

[75] Inventors: Raymond Vanderauwera, St-Pieters-Leeuw; Paul Coulonvaux, Brussels, both of Belgium

[73] Assignee: Donaldson Company, Inc., Minneapolis, Minn.

Reexamination Request:
No. 90/005,050, Jul. 29, 1998

Reexamination Certificate for:
Patent No.: 5,545,241
Issued: Aug. 13, 1996
Appl. No.: 08/373,000
Filed: Jan. 17, 1995

[51] Int. Cl.⁶ .................................................. B01D 35/30
[52] U.S. Cl. ............................ 55/490; 55/493; 55/503; 55/504
[58] Field of Search ..................... 55/503, 504, 337, 55/490, 493, 505; 285/80

[56] References Cited

U.S. PATENT DOCUMENTS

| | | | |
|---|---|---|---|
| 2,916,143 | 12/1959 | McConalogue | 210/236 |
| 3,078,650 | 2/1963 | Anderson et al. | 55/337 |
| 4,256,474 | 3/1981 | Berger, Jr. et al. | 55/482 |
| 4,491,460 | 1/1985 | Tokar | 55/337 |
| 4,720,292 | 1/1988 | Engel et al. | 55/337 |
| 5,013,182 | 5/1991 | Coulvonvaux et al. | 403/30 |
| 5,277,157 | 1/1994 | Teich | 123/198 E |

FOREIGN PATENT DOCUMENTS

| | | |
|---|---|---|
| 93/9129 | 8/1994 | South Africa . |
| 1563649 | 3/1980 | United Kingdom . |

*Primary Examiner*—Richard Chiesa

[57] ABSTRACT

An air cleaner (10) includes a housing (12) having a first section (14) and a second section (16). The first and second sections (14) and (16) are rotationally adjustable relative to one another. Alignment teeth (42) and (60) engage one another to position the two sections (14) and (16) relative to one another. Buckle type clasps (60) engage a ridge (44) to cam together the sections (14) and (16) and lock them in sealed engagement. A mounting bracket (80) includes a somewhat flexible band (82) which extends around the housing (12). The band (82) includes raised block portions (88) extending radially inward and spaced about the inner surface of the band (82). The housing includes a locking portion (30) having recesses formed therein which are spaced and aligned to receive raised block portions (88) of the mounting band (82). When the bracket (80) is placed around the housing (12), the raised block portions engage the recesses of the lock portion (30) and the bracket (80) is held in place. If rotational adjustment is needed between the bracket (80) and the housing (12), the band portion (82) is flexed outward so that the raised block portions may disengage. The band (82) is then unflexed to retain the bracket (80) in its new position.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 10 is cancelled.

Claims 1, 2, 11, 13, and 16–20 are determined to be patentable as amended.

Claims 3–9, 12, 14, and 15, dependent on an amended claim, are determined to be patentable.

1. An air cleaner apparatus, comprising:

a filter element;

a [generally] cylindrical housing;

an inlet;

an outlet; and a rotatably adjustable mounting bracket *comprising a one piece band and an integral mounting portion, the mounting bracket* adjustably attached about a periphery of the housing including means for indexed locking the mounting bracket against the housing.

2. An air cleaner apparatus, comprising:

a filter element;

a [generally] cylindrical housing;

an inlet;

an outlet; and a mounting bracket comprising a *single piece* band including a plurality of raised blocks extending radially inward *and an integral mounting portion*, and wherein the housing comprises a rotational locking portion having recesses formed therein for engaging the blocks of the mounting bracket.

11. An air cleaner according to claim [10] *1*, wherein the band is constructed of a molded plastic.

13. An air cleaner apparatus, comprising:

a filter element;

a [generally] cylindrical housing retaining the filter element;

means for imparting helical air flow around the filter element;

an inlet;

an outlet;

a scavenge for collecting heavy particulate material; and, a rotatably adjustable *single piece* mounting bracket having *an integral mounting portion and* means for indexed locking the mounting bracket against the housing.

16. An air cleaner apparatus, comprising:

a filter element;

a generally cylindrical housing retaining the filter element, and including a first housing member and a second housing member, wherein the first housing member mounts to the second housing member in a rotatably adjustable configuration;

alignment means comprising a plurality of serrations mounted on one of said housing members and [a complementary tooth] *complementary teeth* mounted on the other of said housing members intermeshing with the serrations, *said serrations and teeth projecting in a direction parallel to a longitudinal axis of the housing*;

means for imparting helical air flow around the filter element;

an inlet;

an outlet; and, a scavenge for collecting heavy particulate material.

17. An air cleaner according to claim 16, wherein the other of said housing members comprises an inner annular ridge defining a channel against its interior, and wherein the complementary [tooth is] *teeth are* located in the channel, and wherein the serrations extend into the channel and engage the complementary [tooth] *teeth* when assembled.

18. An air cleaner housing apparatus, comprising:

a [generally] cylindrical housing comprising a first housing member and a second housing member and a plurality of serrations mounted on one of said housing members and a complementary tooth mounted on the other of said housing members intermeshing with the serrations;

an inlet;

an outlet; and a rotatably ajdustable mounting bracket *comprising a one piece band and an integral mounting portion, the mounting bracket* attached about a periphery of the housing.

19. A filter housing apparatus, comprising;

a [generally] cylindrical housing:

an inlet;

an outlet; and a rotatably adjustable mounting bracket *comprising a one piece band and an integral mounting portion, the mounting bracket* attached about a periphery of the housing including means for indexed locking the mounting bracket against the housing.

20. A filter housing apparatus, comprising:

a [generally] cylindrical housing;

an inlet;

an outlet; and a *single piece* mounting bracket comprising a band including a plurality of raised blocks extending radially inward *and an integral mounting portion*, wherein the housing comprises a rotational locking portion having recesses formed therein for engaging the blocks of the mounting bracket.

* * * * *